Feb. 9, 1954
W. J. MIGLEY
2,668,783
PROCESS OF SURFACE FINISHING GLASS
AND ARTICLE PRODUCED THEREBY
Filed Oct. 21, 1949
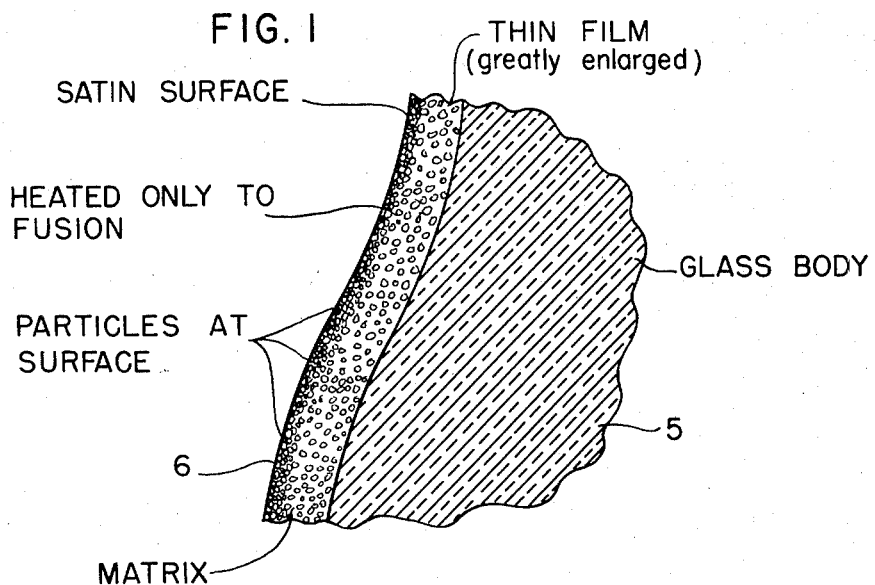
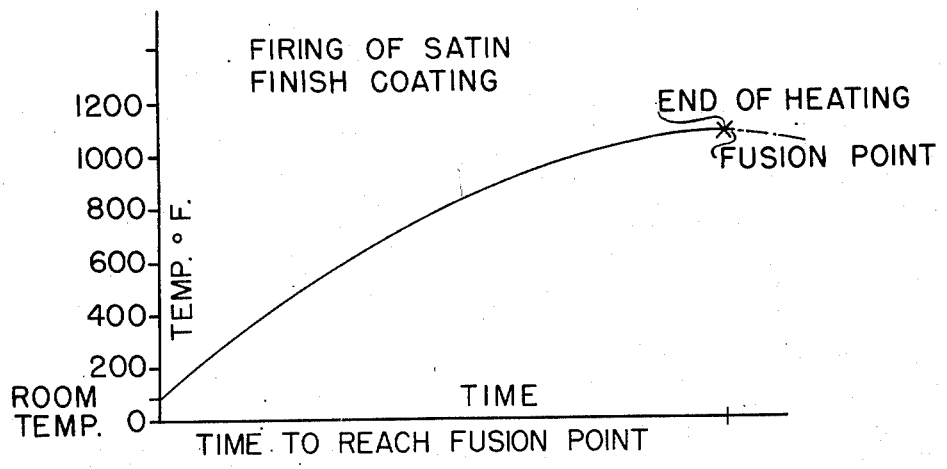
INVENTOR.
William J. Migley
BY
*Norman M. Holland*
ATTORNEY Patented Feb. 9, 1954

2,668,783

UNITED STATES PATENT OFFICE 2,668,783

PROCESS OF SURFACE FINISHING GLASS AND ARTICLE PRODUCED THEREBY

William J. Migley, Lancaster, Ohio, assignor to Anchor Hocking Glass Corporation, Lancaster, Ohio, a corporation of Delaware Application October 21, 1949, Serial No. 122,653

5 Claims. (Cl. 117—124)

This invention relates to glassware and particularly to the surface finish of bottles and the like.

The object of the invention is to provide on glass a fine satin finish which will be attractive, durable and readily kept clean of spots and smudges.

Further objects of the invention, particularly in the form of the finish as a surface coating strongly adherent and maintaining the strength of the glass structure, will appear from the following specification taken in connection with the accompanying drawing in which:

Fig. 1 is a sectional view on enlarged scale of a portion of a glass bottle with a typical coating of this invention; and Fig. 2 is a temperature-time curve illustrating the firing of the coating on the bottle or other glass article.

In the example shown in the drawing portion 5 of the bottle may be of standard composition silicate glass with a thin surface layer or film 6 applied by spraying or the like and after firing giving the desired satin finish.

The surfacing material is first compounded in powdered-granular form and then carefully brought to and not above the fusion point, immersed in water and ground and fluid-mixed with a powdered compound of a high melting point above the temperature of the subsequent firing. The liquid mixture is sprayed on the surface to be coated and the sprayed article is then carried through a firing lehr raising the temperature to a critical point of fusion of the coating at which the satin finish is attained and beyond which it is obscured or lost. By the controlled fusion of the composition and the admixture with the ground frit of the high melting powder the coating is conditioned for special firing to the point of the desired satin surfacing giving a permanent decorative finish of very attractive softness and fineness of texture.

The frit includes mainly the oxides of lead and silica and also in minor percentage the oxide of aluminum and oxides of the group boron, sodium, titanium and lithium and the typical composition listed below would give a frit having the oxides in the preferred percentage ranges indicated:

| percent | composition, when fired gives | frit | in preferred range in percent |
|---|---|---|---|
| 39 | lead oxide | PbO | 30–40 |
| 27 | sand | SiO$_2$ | 25–35 |
| 12 | aluminum hydrate | Al$_2$O$_3$ | 5–10 |
| 9 | lead titanate | TiO$_2$ | 1–10 |
| 4 | sodium titanium silicate (PbO)(SiO$_2$)(TiO$_2$) | Na$_2$O | 1–5 |
| 5 | borax (Na$_2$O) | B$_2$O$_3$ | 1–5 |
| 3 | lithium carbonate | Li$_2$O | 1–5 |

The main compounds are those of lead, silicon and aluminum and the batch including the other ingredients is fused at 1800 to 2000° F. until it is a molten mass at which point the heating is stopped to avoid protracting the heating effect. As soon as the mass becomes molten it is dropped into water and hardened and fractured and is removed and delivered to a ball mill in which it is water-ground until it will pass a 325 mesh screen. To each fifty pounds of the batch eighteen pounds of water are added and six pounds of ethyl alcohol, the alcohol aiding in the suspension.

During the grinding three to seven pounds (preferably 5 pounds) of a high melting powder, such as a barium or strontium compound (barium sulphate being an example), are added to each fifty pounds of the batch in the wet mix which is then brought to the proper consistency for spraying and is sprayed on glass containers such as gin bottles. There is little or no flow or draining of the sprayed film on the article, the layer being very thin and adherent.

The sprayed articles are then carried through a firing lehr and heated to and not above the fusing point of the coating which is relatively high but below the melting point of the coated article. During this heating in the lehr the coating is progressively increased in temperature, for instance, as shown in the curve of Fig. 2, at a rate which permits of control of the resulting surface fusion, the maximum temperature being preferably 1100 to 1150° F. with the fusing period running from 5 to 15 minutes and acting to re-anneal the glass at the same time that it fuses the coating on it.

The effect of this firing treatment develops a mat finish maturing to a satin finish of very fine texture at the point of fusion and before spreading of the melted ingredients to a gloss. At the same time a very firm bond between the surface coating and the glass base is attained.

It is important to avoid overheating or protracted heating of the surface film as the satin finish appears because such over-treatment will detract from the mat surface effect by over-emphasis of the gloss, the period of precise balance for the desired surfacing being well defined and observable with the composition frit of this invention. With the particular ingredients above described and with a regular heating of the surface film in the lehr the satiny sheen will be evident at a point immediately above 1150° F. and will, of course, be readily determinable for each type of article and the composition and depth of the film. At the same time the composite coating is integrally fused so that all particles are consolidated and the surface is not rough or pitted and is easily wiped clean of finger marks, smudges and the like without detracting from the satiny appearance of the finish. This automatic balancing between the frosted and glazed surfacings is characteristic of the composition fritted as above described and mixed with the powdery and high melting ingredient. The fusing of the coating to give the finish actually strengthens the glass surface while at the same time imparting the unique, soft, evenly distributed, satiny texture. Even under high magnification the surface is smooth and regular and shows no scratches or pitting but only a uniform fine texture with the individual reflecting particles indistinguishable in the body of the film.

Particles contributing to the satiny appearance thus appear at the film surface in sufficient concentration to prevail over any tendency toward a bright reflecting gloss and the total effect as the light rays strike and penetrate this surface is most pleasing and readily distinguishable from prior frosted effects which are relatively coarse and chalky.

The composition described above is typical and may be varied within the principle of this invention. The inclusion of the aluminum oxide raises the fusion point and this or some equivalent compound is much preferred in the frit as contributing to the accurate control of the fusing point and the distinctness with which the satiny appearance develops as this point is approached.

The thickness of the coating 6 as sprayed is of the order of .001" to .002" and in the lehr is reduced to a very thin film of the order of .0003" to .0001".

The materials are inexpensive, the process simple and accurately determinable and the resulting decorative effect is new, uniform from article to article, clean, pleasing and satisfying in eye-appeal and readily maintained so in service.

Having thus described my invention, I claim:

1. The process for forming a decorative coating on a glass article comprising compounding frit-forming, glass-surfacing materials in a powdered granular mixture, bringing said mixture to and not above its fusion point, and maintaining the mixture at this temperature to avoid exceeding the fusion point, hardening and fracturing said fused mixture by liquid immersion as soon as the mass becomes molten and grinding and mixing it in a liquid medium with powdery particles of a higher melting compound to provide a liquid suspension thereof, said high melting particles being adapted to impart a satiny finish to the final coating, coating said liquid suspension as a film on the surface of said article and progressively increasing the temperature of said coating and article to the point of fusion of the frit particles whereby initial development of a gloss follows but below the melting point of said powdery particles, so that there is accumulated in said film at the outer surface thereof a relatively large proportion of said higher melting particles in sufficient concentration there to predominate over said initial gloss and impart a satiny finish to the surface of the film, and then immediately terminating said heating at said point and before the spreading of the melted ingredients into a gloss, and thereby fixing said satiny surface as a permanent decoration of said article.

2. The process of forming a decorative coating on a glass article as set forth in claim 1 in which the said liquid suspension film on the surface of the article is applied in a thickness of the order of .001 of an inch to .002 of an inch and during the heating is reduced in thickness to the order of .0003 of an inch to .0001 of an inch.

3. A process for forming a decorative coating on a glass article as set forth in claim 1 in which the higher melting compound is barium sulphate.

4. The glass article fabricated by the process of claim 1 to have at the outer surface of its decorative coating a relatively large proportion of higher melting particles to impart a satiny finish to the surface.

5. A glass article as set forth in claim 4, in which the higher melting particles are of barium sulphate.

WILLIAM J. MIGLEY.

References Cited in the file of this patent

UNITED STATES PATENTS

| Number | Name | Date |
| --- | --- | --- |
| 748,851 | Duncan | Jan. 5, 1904 |
| 2,169,194 | Geyer et al. | Aug. 8, 1939 |
| 2,225,161 | Deyrup | Dec. 17, 1940 |
| 2,397,005 | Harbert et al. | Mar. 19, 1946 |

FOREIGN PATENTS

| Number | Country | Date |
| --- | --- | --- |
| 531,146 | Great Britain | Dec. 30, 1940 |

OTHER REFERENCES

Ceramic Industry, January 1945, vol. 44, No. 1, pages 69 and 74.